US006686903B1

(12) United States Patent
Peng

(10) Patent No.: US 6,686,903 B1
(45) Date of Patent: Feb. 3, 2004

(54) WIRELESS MOUSE CAPABLE OF GENERATING AND ACCUMULATING ELECTRICAL ENERGY

(75) Inventor: Morris Peng, Taipei (TW)

(73) Assignee: Silitek Corporation, Taipei (TW)

( * ) Notice: Subject to any disclaimer, the term of this patent is extended or adjusted under 35 U.S.C. 154(b) by 0 days.

(21) Appl. No.: 09/628,342

(22) Filed: Jul. 28, 2000

(51) Int. Cl.⁷ .................................. G09G 5/08
(52) U.S. Cl. ..................... 345/163; 345/164; 345/167
(58) Field of Search ........................ 345/163, 164, 345/167

(56) References Cited

U.S. PATENT DOCUMENTS

| | | | | |
|---|---|---|---|---|
| 3,987,685 A | * | 10/1976 | Opocensky | 273/148 B |
| 4,594,586 A | * | 6/1986 | Hosogoe | 345/164 |
| 4,754,268 A | * | 6/1988 | Mori | 345/158 |
| 6,128,004 A | * | 10/2000 | McDowall et al. | 345/156 |
| 6,211,861 B1 | * | 4/2001 | Rosenberg et al. | 345/163 |

OTHER PUBLICATIONS

The U.S. Navy, 1980, Dover Publications, Inc., Fourth edition, pp. 93 and 98.*

* cited by examiner

Primary Examiner—Matthew C. Bella
Assistant Examiner—Tam Tran
(74) Attorney, Agent, or Firm—Rabin & Berdo, P.C.

(57) ABSTRACT

A wireless mouse capable of generating and accumulating electrical energy. The wireless mouse includes: (a) a first rolling wheel, which longitudinally props up the rolling ball and detects the displacement of the wireless mouse along the X-axis; (b) a second rolling wheel, which transversely props up the rolling ball and detects the displacement of the wireless mouse projected along the Y-axis; (c) an auxiliary rolling wheel, wherein the auxiliary rolling wheel, the first rolling wheel, and the second rolling wheel together prop up the rolling ball to keep the rolling ball in a certain rolling position; (d) at least one power generating device for transforming the dynamic energy produced by revolutions of the first/second rolling wheel to electrical energy; (e) an power storage device for storing electrical energy; and (f) a RF transmitting module for transmitting a moving signal of the wireless mouse and control signals of the left and right buttons.

17 Claims, 2 Drawing Sheets

WIRELESS MOUSE CAPABLE OF GENERATING AND ACCUMULATING ELECTRICAL ENERGY

BACKGROUND OF THE INVENTION

This application incorporates by reference Taiwanese application Serial No. 5 89109054, Filed May 5, 2000.

1. Field of the Invention

The invention relates in general to a wireless mouse, and more particularly to a wireless mouse having the functions of self-generating and self-accumulating electrical energy.

2. Description of the Related Art

The development of the personal computer has been very rapid. The prior large-size computers have been modified into a desk-top or even smaller size personal computers (PC). Size minimization becomes one of the reasons causing the popularity of the PC. A PC is usually accompanied by peripherals, such as a mouse and a keyboard. However, the wires of the computer peripherals cause the user great inconvenience. Since the wires connected to the computer may tangle with each other or other objects, the application of a mouse is limited. To meet the requirement of the users, a wireless mouse has therefore been proposed. Conventionally, a battery has been essential for the operation of a wireless mouse. However, frequent replacement of the battery still causes the user great inconvenience and extra expense. Moreover, it wastes additional natural resources and produces more wastes like the used battery.

SUMMARY OF THE INVENTION

It is therefore an object of the invention to provide a wireless mouse having the function of self-power generating and accumulating by ways of transforming the dynamic energy into electrical energy. The self-generated and accumulated power is sufficient for the power consumption of the mouse according to the invention so that no additional battery is needed, which complies with the principle of environment protection. Moreover, the apparatus for self-power generating and accumulating of the mouse does not expand the size of the mouse but fully makes use of the space of the mouse. Therefore, the mouse according to the invention keeps the same size but has more utility.

The invention achieves the above-identified objects.by providing a wireless mouse capable of generating and accumulating electrical energy. The wireless mouse includes a rolling wheel, the first rolling wheel, the second rolling wheel, an auxiliary rolling wheel, the first power generating device, the second power generating device, a power storage device, a RF transmitting module. The first rolling wheel longitudinally props up the rolling ball and detect the displacement of the wireless mouse projected along X-axis. The second rolling wheel transversely props up the rolling ball and detect the displacement of the wireless mouse projected along Y-axis. The auxiliary rolling wheel, the first rolling wheel, and the second rolling wheel together prop up the rolling ball to keep the rolling ball in a certain rolling position. The first/second power generating device transforms the dynamic energy produced by revolutions of the first/second rolling wheel to electrical energy. The power storage device stores electrical energy. The RF transmitting module transmits a moving signal of the wireless mouse and control signals of the left and right bottoms.

BRIEF DESCRIPTION OF THE DRAWINGS

Other objects, features, and advantages of the invention will become apparent from the following detailed description of the preferred but non-limiting embodiments. The description is made with reference to the accompanying drawings in which.

DESCRIPTION OF THE PREFERRED EMBODIMENT

Figure 1:
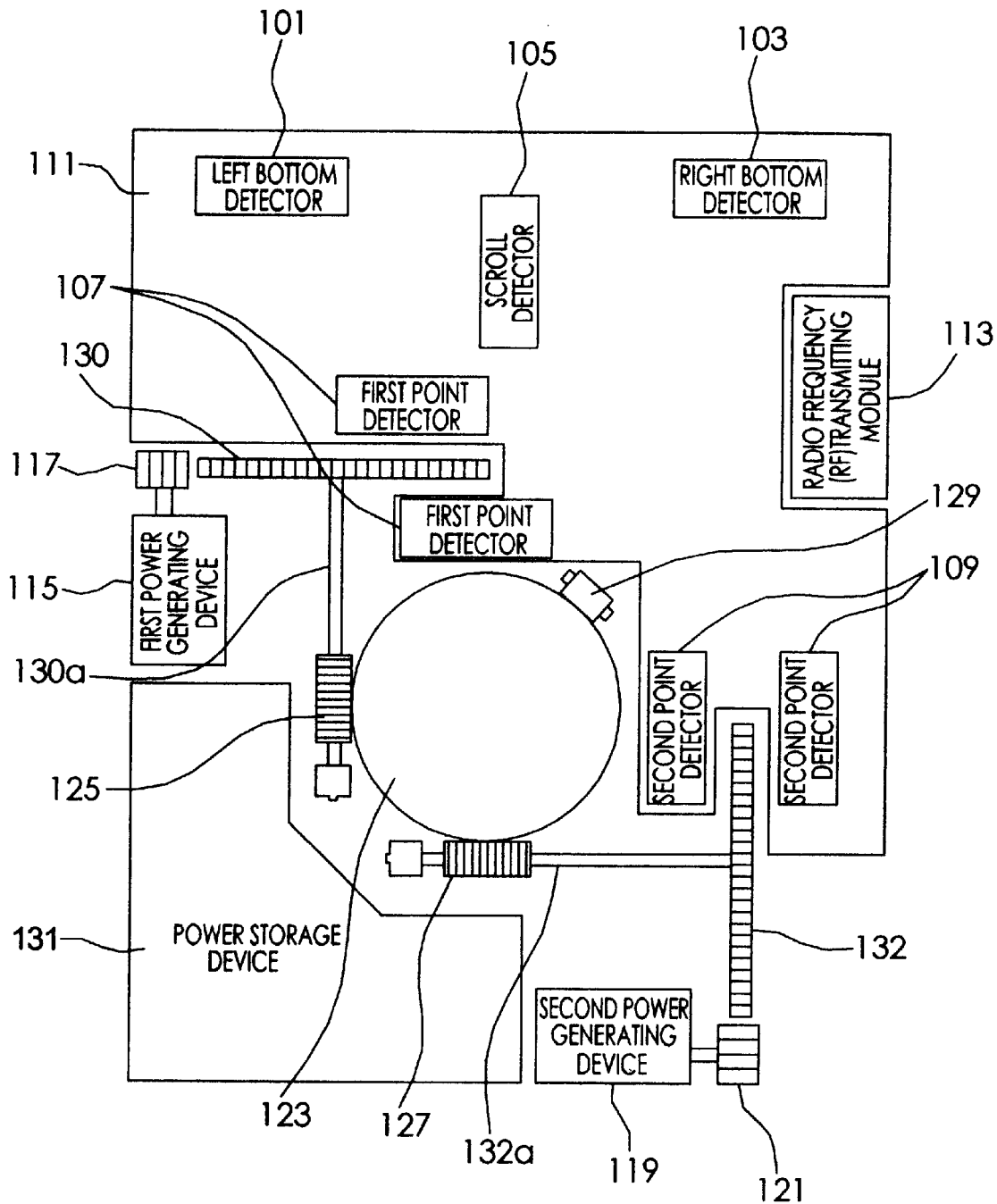
FIG. 1 illustrates the structure of the wireless mouse capable of generating and accumulating electrical energy according to a preferred embodiment of the invention.

Referring to FIG. 1, in the housing of the wireless mouse, there are a printed circuit board (PCB) 111, and further a left button detector 101, a right button detector 103 and a scroll detector 105 on the PCB 111. The left button detector 101, the right button detector 103 and the scroll detector 105 respectively detect the input of the left button, the right button and the scroll wheel of the mouse. PCB 111 further includes a radio frequency (RF) transmitting module 113 for transmitting the moving signal of the mouse and the control signals of the left bottom and the right buttons to the computer mother board.

As shown in FIG. 1, the mouse further includes a rolling ball 123, a first rolling wheel 125, a second rolling wheel 127 and an auxiliary wheel 129 inside the housing. The first rolling wheel 125, the second rolling wheel 127 and the auxiliary wheel 129 prop up the rolling ball 123 so that the rolling ball 123 is kept in a certain rolling position. The first rolling wheel 125 longitudinally props up the rolling ball 123 in order to detect the displacement of wireless mouse projected along the X-axis. On the other hand, the second rolling wheel 127 transversely props up the rolling ball 123 in order to detect the displacement of the wireless mouse projected along the Y-axis. The displacement of the mouse induces the rolling of the rolling ball 123. And further the rolling of the rolling ball 123 actuates the first rolling wheel 125, the second rolling wheel 127 or both to turn. The revolutions of the first rolling wheel 125 is determined by the displacement of the wireless mouse projected along the X-axis and the revolutions of the second rolling wheel 127 is determined by the displacement of the wireless mouse projected along the Y-axis. Therefore, the displacement of the wireless mouse along the X-axis and Y-axis can be detected by using the first rolling wheel 125 and the second rolling wheel 127 as indicators.

The wireless mouse according to the invention further includes a first gear-wheel 130 and a second gear-wheel 132. The first gear-wheel 130 and the first rolling wheel 125 are connected by the first shaft 130a and therefore turn with each other. On the other hand, the second gear-wheel 132 and the second rolling wheel 127 are connected by a second shaft 132a and therefore turn with each other. A first point detector 107 and a second point detector 109 inside the housing of the wireless mouse according to the invention respectively detect the revolutions of the first gear-wheel 130 and the second gear-wheel 132. Consequently, the direction and distance of displacement can be derived therefrom.

Furthermore, the wireless mouse according to a preferred embodiment of the invention preferrably includes the auxiliary wheel 129, which contributes to keeping the rolling ball 123 balance by propping up the rolling ball 123.

Referring to FIG. 1, the wireless mouse according to the preferred embodiment of the invention further includes a first power generating device 115 and a second power generating device 119, which respectively transform the dynamic energy of the first rolling wheel 125 and the second rolling wheel 127 to electrical energy. The first power generating device 115 is connected to a third gear-wheel 117, which is hi conjunction with the first gear-wheel 130, by a shaft. The second power generating device 119 is connected to a fourth gear-wheel 121, which in conjunction with the second gear-wheel 132, by another shaft.

The displacement of the mouse drives the first rolling wheel 125 and further the first gearwheel 130 and the third gear-wheel 117. The dynamic energy produced by the revolutions of the third gear-wheel 117 is then transformed into electrical energy by the first power generating device 115 and the electrical energy is outputted to a power storage device 131.

Similarly, the displacement of the mouse also drives the second rolling wheel 127 and further the second gear-wheel 132 and the fourth gear-wheel 121. The dynamic energy produced by the revolutions of the fourth gear-wheel 121 is then transformed into electrical energy by the second power generating device 119. The transformed electrical energy is then outputted to the power storage device 131 together with the transformed electrical energy produced originally by the revolutions of the third gear-wheel 117.

Preferably, each of the first gear-wheel 130 and the second gear-wheel 132 can be designed to have 63 teeth and the distance of two adjacent teeth can be 1 mm. The gear ratio of the rolling ball 123, the first or the second gear-wheel 130/132 and the third or the fourth gear-wheel 117/121 can be 1:7:35. Either The first power generating device 115 or the second power generating device 119 can be an AC or DC power generator capable of outputting current of 3.5 Volt, 10 mA.

Figure 2:
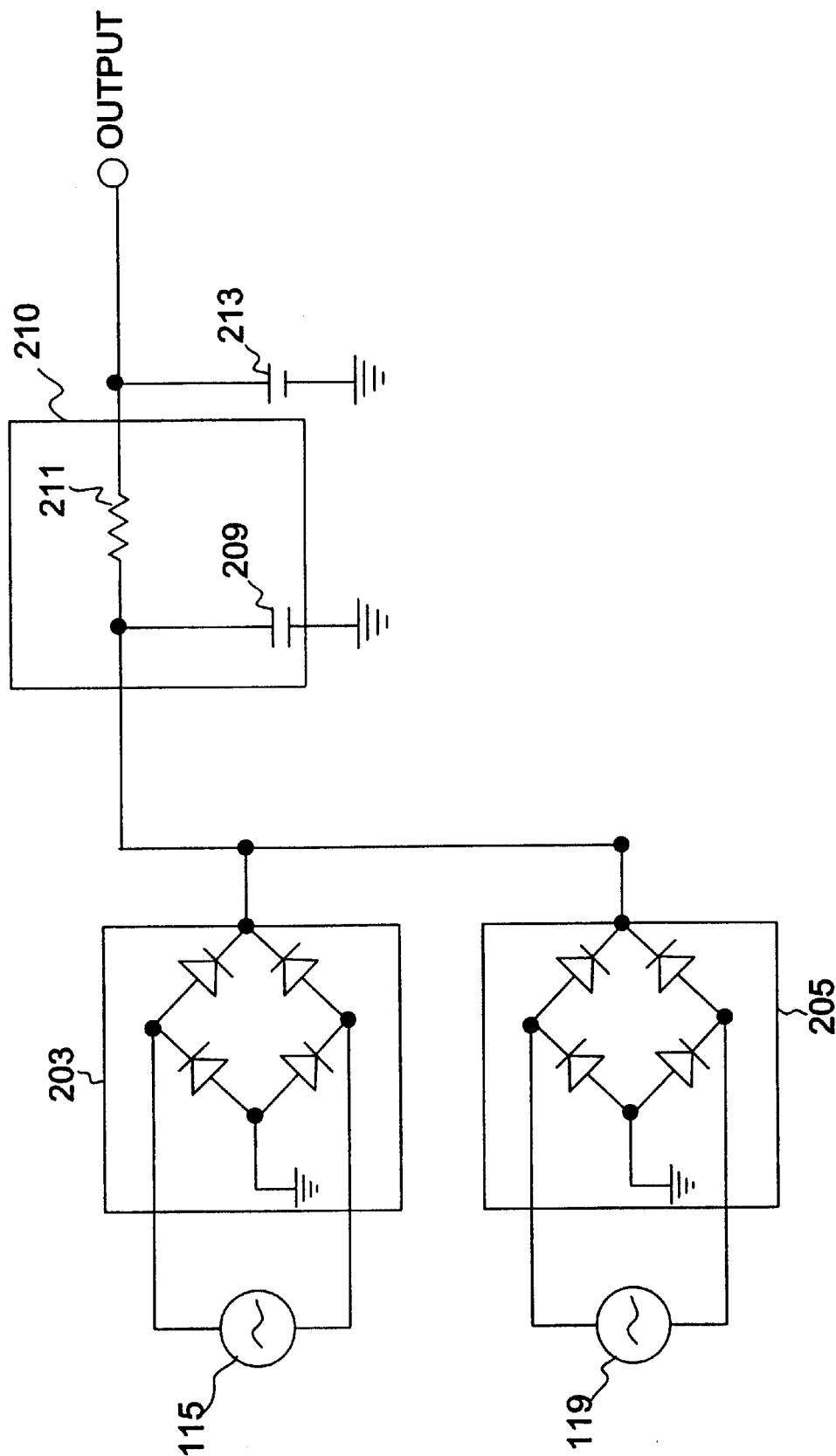
FIG. 2 illustrates the circuit of the power storage device of the wireless mouse capable of generating and accumulating electrical energy according to a preferred embodiment of the invention.

Referring to FIG. 2, the first power generating device 115 and the second power generating device 119 output the electrical energy to the first bridge rectifier 203 and the second bridge rectifier 205, respectively. The main function of the first bridge rectifier 203 and the second bridge rectifier 205 is td transform the current outputted from the first power generating device 115 and the second power generating device 119 to DC current. The transformed DC current can be either outputted through the voltage regulator 210 and the output terminal or stored in the battery 213. The voltage regulator 210 preferably includes a resistance 211 and a capacitor 209. One terminal of the resistance 211 is coupled to the first bridge rectifier 203 and the second bridge rectifier 205. The other terminal of the resistance 211 is coupled to the output terminal. One terminal of the capacitor 209 is coupled to the first bridge rectifier 203, the second bridge rectifier 205 and the resistance 211. The other terminal of the capacitor 209 is grounded. The transient unstable voltage can be bypassed through the capacitor 209. The battery 213, preferably a 3 Voltage battery, accumulates the electrical energy. While generated electrical energy is insufficient for the wireless mouse, the accumulated electrical energy is outputted.

The wireless mouse according to a preferred embodiment of the invention has the following advantages:
1. Since the wireless mouse is cable of self-generating and self-accumulating power, no battery is needed.
2. Work of changing batteries and extra expense brought by batteries are both saved.
3. No replacement battery is needed, which complies with the principle of environment protection.
4. The wireless mouse of the invention has reduced static floatability, which therefore increases the stability of operation.

While the invention has been described by way of example and in terms of the preferred embodiment, it is to be understood that the invention is not limited to the disclosed embodiment. To the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wireless mouse capable of generating and accumulating electrical energy, comprising:
   a rolling ball;
   a first rolling wheel, which longitudinally props up the rolling ball in order to detect the displacement of the wireless mouse projected along an X-axis;
   a second rolling wheel, which transversely props up the rolling ball in order to detect the displacement of the wireless mouse projected along a Y-axis;
   an auxiliary rolling wheel, wherein the auxiliary rolling wheel, the first rolling wheel, and the second rolling wheel together prop up the rolling ball so that the rolling ball is kept in a certain rolling position;
   a first power generating device for transforming the dynamic energy produced by revolutions of the first rolling wheel to electrical energy;
   a second power generating device for transforming the dynamic energy produced by revolutions of the second rolling wheel to electrical energy;
   a power storage device for storing electrical energy generated by the first power generating device and the second power generating device; and
   a radio frequency (RF) transmitting module for transmitting a moving signal of the wireless mouse.

2. The wireless mouse as claimed in claim 1, further comprising:
   a left button;
   a left button detector for detecting actuation of the left button;
   a right button; and
   a right button detector for detecting actuation of the right button;
   wherein the radio frequency control module additionally transmits control signals indicating actuation of the left and right buttons.

3. The wireless mouse as claimed in claim 1, further comprising:
   a scroll wheel; and
   a scroll detector for detecting actuation of the scroll wheel,
   wherein the radio frequency control module additionally transmits control signals indicating actuation of the scroll wheel.

4. The wireless mouse as claimed in claim 1, further comprising:
   a first gear-wheel, which is connected to the first rolling wheel by a first shaft so that the first gear-wheel and the first rolling wheel turn together with each other; and
   a second gear-wheel, which is connected to the second rolling wheel by a second shaft so that the second gear-wheel and the second rolling wheel turn together with each other.

5. The wireless mouse as claimed in claim 4, wherein the wireless mouse further comprises a third gear-wheel coaxially connected to the first generating device and a fourth gear-wheel coaxially connected to the second generating device, and wherein the first generating device is indirectly connected to the first gear-wheel by the third gear-wheel, which meshes with the first gear-wheel, and the second generating device is indirectly connected to the second gear-wheel by the fourth gear-wheel, which meshes with the second gear-wheel.

6. The wireless mouse as claimed in claim 1, wherein the power storage device comprises:
   a first bridge rectifier for receiving the electrical energy outputted by the first generating device;
   a second bridge rectifier for receiving the electrical energy outputted by the second generating device;
   a voltage regulator for stably outputting current, wherein the voltage regulator is coupled to the first bridge rectifier and the second bridge rectifier; and
   a battery for storing electrical energy, wherein the battery is coupled to the voltage regulator.

7. The wireless mouse as claimed in claim 6, wherein the voltage regulator comprises:
   a resistance, wherein the resistance has a first terminal coupled to the first and second bridge rectifiers and a second terminal coupled to the battery; and
   a capacitor having a first terminal that is coupled to the first terminal of the resistance and a second terminal, which is grounded.

8. The wireless mouse as claimed in claim 1, further comprising:
   a first point detector for detecting revolutions of the first rolling wheel; and
   a second point detector for detecting revolutions of the second rolling wheel.

9. A wireless mouse capable of generating and accumulating electrical energy, comprising:
   a rolling ball;
   a first rolling wheel that is mounted for rotation about an axis extending in a first direction, the first rolling wheel engaging the rolling ball;
   a second rolling wheel that is mounted for rotation about an axis extending in a second direction, the second rolling wheel engaging the rolling ball;
   an auxiliary rolling wheel, wherein the auxiliary rolling wheel, the first rolling wheel, and the second rolling wheel together prop up the rolling ball so that the rolling ball is kept in a certain rolling position;
   a first movement sensor, linked to the first rolling wheel, for generating moving signals when the first rolling wheel rotates;
   a first power generating device, linked to the first rolling wheel and to the first movement sensor, for transforming dynamic energy produced by the revolutions of the first rolling wheel to electrical energy;
   a second movement sensor, linked to the second rolling wheel, for generating moving signals when the second rolling wheel rotates;
   a second power generating device, linked to the second rolling wheel and to the second movement sensor, for transforming dynamic energy produced by the revolutions of the second rolling wheel to electrical energy; and
   a radio frequency (RF) transmitting module for transmitting the moving signals.

10. The wireless mouse as claimed in claim 9, further comprising:
    a left button;
    a left button detector for detecting actuation of the left button;
    a right button; and
    a right button detector for detecting actuation of the right button,
    wherein the radio frequency transmitting module additionally transmits control signals indicating actuation of the left and right buttons.

11. The wireless mouse as claimed in claim 10, further comprising:
    a scroll wheel; and
    a scroll wheel detector for detecting actuation of the scroll wheel,
    wherein the radio frequency transmitting module additionally transmits control signals indicating actuation of the scroll wheel.

12. The wireless mouse as claimed in claim 9, further comprising:
    a first gear-wheel, which is coaxially connected to the first rolling wheel so that the first gear-wheel and the first rolling wheel turn together with each other.

13. The wireless mouse as claimed in claim 12, wherein the wireless mouse further comprises a second gear-wheel connected to the first generating device, and wherein the first generating device is indirectly connected with the first gear-wheel by the second gear-wheel, which meshes with the first gear-wheel.

14. The wireless mouse as claimed in claim 9, further comprising:
    a power storage device for storing electrical energy generated by the first power generating device.

15. The wireless mouse as claimed in claim 14, wherein the power storage device comprises:
    a first bridge rectifier for receiving the electrical energy outputted by the first generating device;
    a voltage regulator for stably outputting current, wherein the voltage regulator is connected to the first bridge rectifier; and
    a battery for storing electrical energy, wherein the battery is connected to the voltage regulator.

16. The wireless mouse as claimed in claim 15, wherein the voltage regulator comprises:
    a resistance, wherein the resistance has a first terminal coupled to the first bridge rectifier and a second terminal coupled to the battery; and
    a capacitor, wherein the capacitor has a first terminal coupled to the first bridge rectifier and a grounded second terminal.

17. The wireless mouse as claimed in claim 9, further comprising:
    a first point detector for detecting revolutions of the first rolling wheel; and
    a second point detector for detecting revolutions of the second rolling wheel.

* * * * *